United States Patent
Holzman

[15] 3,671,932
[45] June 20, 1972

[54] TWO-SWEEP SIGNAL TRANSMISSION AND RECEPTION IN SEISMIC EXPLORATION

[72] Inventor: Mark Holzman, Houston, Tex.

[73] Assignee: Western Geophysical Company of America, Houston, Tex.

[22] Filed: May 4, 1970

[21] Appl. No.: 34,067

[52] U.S. Cl.............340/15.5 CP, 340/15.5 DP, 340/15.5 TC
[51] Int. Cl. ..........................................................G01v 1/22
[58] Field of Search.............................340/15.5 PP, 15.5 TC

[56] References Cited

UNITED STATES PATENTS

| | | | |
|---|---|---|---|
| 3,332,511 | 7/1967 | Silverman | 341/15.5 TC |
| 3,259,878 | 7/1966 | Mifsud | 340/15.5 TC |
| 3,416,632 | 12/1968 | Bodine, Jr. | 340/15.5 TC |
| 3,332,512 | 7/1967 | Undt | 340/15.5 |

Primary Examiner—Benjamin A. Borchelt
Assistant Examiner—N. Moskowitz
Attorney—Michael P. Breston, Alan C. Rose, Walter R. Thiel and Alfred B. Levine

[57] ABSTRACT

This invention contemplates a method of seismic exploration using vibrators which are driven simultaneously by the combination of two distinct sweep signals. The combined signal is obtained, for example, by adding or subtracting the two distinct signals. The reflected seismic signals are detected in the usual fashion and recorded on a recording medium such as magnetic tape. If the number of seismic signals transmitted into the ground is an even number then the reflected seismic signals corresponding to each of said distinct signals can be obtained by summing, which includes adding and/or subtracting, the detected seismic signals.

4 Claims, 1 Drawing Figure

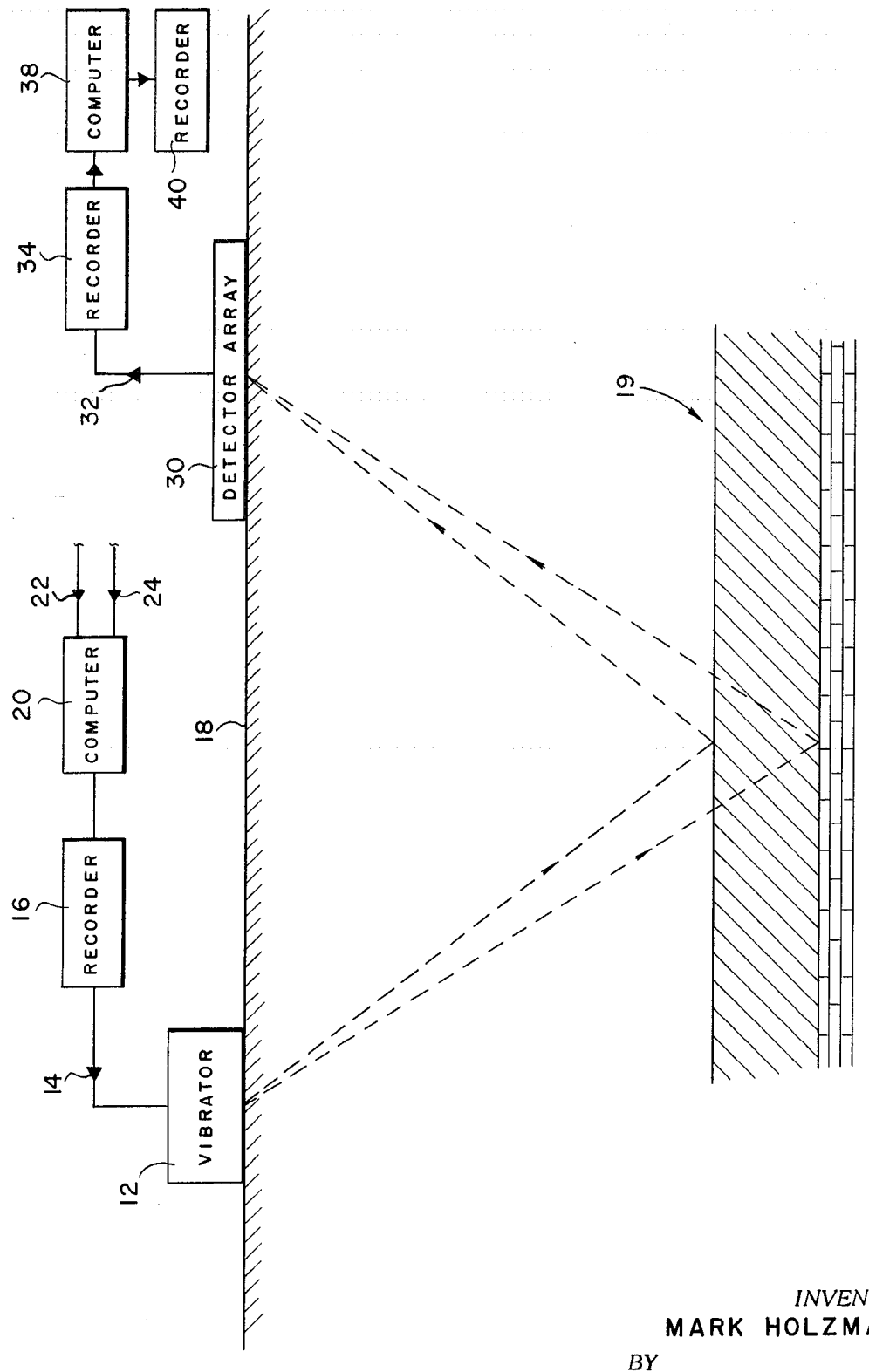

TWO-SWEEP SIGNAL TRANSMISSION AND RECEPTION IN SEISMIC EXPLORATION

BACKGROUND OF THE INVENTION

Vibrators are frequently used as energy sources for land or marine seismic exploration. A vibrator transmits energy into the ground and is driven with an electric sweep signal whose frequency is made to vary as a function of time over a predetermined frequency range. The reflected signal from each transmission is detected by an array of detectors such as geophones or hydrophones. Thereafter, the vibrator is moved to a new transmission location, and the transmission and reception steps are repeated. The number of signal transmissions employed and the particular sweep frequency range utilized depend on the specific geologic structure being surveyed. To eliminate or minimize noise and to optimize the signal-to-noise ratio, it is conventional to sum the detected signals.

The frequency bandwidth of the sweep signal typically has a range from say 10–50 Hz. Quite frequently, it may be desired or necessary to survey a particular geological area with two or more sweep signals. For example, it may be desired to survey the area with two sweep signals having respectively frequency ranges from 10–20 Hz and from 30–50 Hz. If both sweep signals are used to consecutively energize the vibrator, then an appreciable loss of valuable exploration time results. If one sweep signal is used with a frequency range from 10–50 Hz, then the energy in the 20–30 Hz band is wasted.

Additionally, since the energy of the transmitted signal is proportional to the total sweep time T, then for a given constant sweep time T, the energy in the 10–20 Hz band, when it is only a segment of the 10–50 Hz band is much less than it would be if the 10–20 Hz sweep signal were transmitted during the entire sweep time T.

The examples above given relate to two distinct bandwidths. In some instances, it may be desired for the bandwidths to overlap: say, one signal with a bandwidth between 10–40 Hz and the other between 30–50 Hz.

In practicing conventional methods, the required number of signal transmissions is doubled when it is required to drive the vibrator with two distinct sweep signals. For example, the vibrator can be driven at one location with one sweep signal during a first time interval, and with the other sweep signal during a second time interval. The vibrator is then moved to another transmission location to again become consecutively energized by the two distinct sweep signals.

On the other hand, in practicing prior art methods, the vibrator could be driven by the first signal at each desired transmission location. Thereafter, the vibrator is driven with the other sweep signal at each of the previous transmission locations. But, whether the vibrator is consecutively driven by the two sweep signals at each transmission location, or whether it is driven at each transmission location first by one sweep signal and later by the other sweep signal, there is engendered in each case a considerable loss of valuable time and/or energy.

SUMMARY OF THE INVENTION

In accordance with the present invention, the vibrator is energized at each transmission location by a combined sweep signal which is either the sum or the difference of the individual sweep signals. In order to recover the seismic reflections due to each individual sweep signal, the number of signal transmissions by the vibrator is limited to an even number. The detected seismic signals are then suitably combined to obtain the reflections corresponding to the individual sweep signals.

BRIEF DESCRIPTION OF THE DRAWINGS

In the drawing the sole FIGURE schematically illustrates the practice of the invention.

A mechanical vibrator 12, which is commercially available and well described in U.S. patents, is driven by a combined sweep signal 14 typically read from a magnetic tape in a recorder 16. The combined signal 14 can be produced by a digital or analog computer 20. Computer 20 receives two distinct individual sweep signals 22 and 24 and combines them in a manner subsequently illustrated.

Vibrator 12 transmits into ground 18, during a total sweep time T, seismic energy which becomes reflected from subterranean layers 19. The reflected energy is detected by an array of detectors 30, typically geophones or hydrophones, and converted by array 30 into an electric signal 32. The detected signal 32 is fed to a recorder 34 and thence to a computer 38. Digital computers are preferred because of their greater versatility and accuracy. After the transmission and reception intervals, vibrator 12 and array 30 are moved to their next respective positions and the above steps are repeated.

The practice of this invention will be better understood with reference to specific examples. In these examples, it is assumed that it is desired to operate the equipment at each of a number of vibration locations or points which will herein below be designated as VP's and that the number of such VP's in every instance will be even and thus equal to 2N where N is an integer.

For a first example, let the number of VP's be 2, and $S_1 = $ Sweep signal 22
$S_2 = $ Sweep signal 24
$T_1 = S_1 + S_2 = $ Signal 14, for VP No. 1, and
$T_2 = S_1 - S_2 = $ Signal 14, for VP No. 2

It thus follows that, $T_1 + T_2 = 2S_1$, and
$T_1 - T_2 = 2S_2$

Hence the reflections from the individual signals can be recovered by suitably summing the received, detected signals 32.

Let $R_1$ be the received signal from VP No. 1, and $R_2$ be the received signal from VP No. 2.

Then since the transmission of acoustic waves in the earth is effectively linear, the summed signal $(R_1 + R_2)$ will have the same characteristics as that which would have been produced from signal $S_1$ alone, and $(R_1 - R_2)$ will be equated to the signal receivable from the transmission of $S_2$ alone. As a second example, let $2N = 6$, and

| | |
|---|---|
| $T_1 = S_1 + S_2$ | for VP No. 1 |
| $T_2 = S_1 + S_2$ | for VP No. 2 |
| $T_3 = S_1 + S_2$ | for VP No. 3 |
| $T_4 = S_1 - S_2$ | for VP No. 4 |
| $T_5 = S_1 - S_2$ | for VP No. 5 |
| $T_6 = S_1 - S_2$ | for VP No. 6 |

If the result of transmitting $S_1$ is desired, then sum the corresponding detected signals $R_1, R_2, \ldots R_6$ $$\sum_{\kappa=1}^{6} R_\kappa = 6Q_1, \text{ and}$$

if the result of transmitting $S_2$ is desired, then first subtract the detected signals as follows:

$R_1 - R_4 = D_1 = 2Q_2$
$R_2 - R_5 = D_2 = 2Q_2$
$R_3 - R_6 = D_3 = 2Q_2$

Then, sum the differences $$\sum_{\kappa=1}^{3} D_\kappa = 6Q_2$$

where $R_\kappa$ is the received signal resulting from the transmission of sweep $T_\kappa$, and $Q_\kappa$ is the received signal which would have resulted from the transmission of sweep $S$.

Thus, the algebraic sum, which is obtained by adding and/or subtacting, of the detected composite electric signals $R_1$ and $R_2$ will provide either the sum of the reflected signals resulting only from the first sweep signal $S_1$ and/or resulting only from the second sweep signal $S_2$. In the general case:

If $T = S_1 + (-)^{+1} S_2$ $$2NQ_1 = \sum_{\kappa=1}^{2N} R_\kappa, \text{ and}$$

$$2NQ_2 = \sum_{\kappa=1}^{2N} (-)R_\kappa$$

From the above examples, it can be generalized that to sum $2N$ signals, vibrator 12 is driven by $2N/2$ sum sweep signals and $2N/2$ difference sweep signals. Then, to obtain the equivalent of the sum of the first sweep signals $S_1$, the detected signals are added; to obtain that of the sum of the second sweep signals $S_2$, the detected signals are suitably combined, as illustrated in the examples and the general formula. The various additions and subtractions are accomplished by computer 38 and the results are recorded by recorder 40 coupled to the output of computer 38.

It is to be understood that the proper crosscorrelation operator to be used in processing the signals obtained hereunder must be the signals $S_1$ and $S_2$. If signals $S_1$ and $S_2$ are available, they may be used as crosscorrelation operators without further refinement.

In normal recording practice it is, however, conventional to record the applied sweep actually used in the field on a separate recording channel of the recording equipment 16. In such cases the individual sweep signals $S_1$ and $S_2$ are not readily available. They must, therefore, be reconstructed for use as crosscorrelation operators by applying to the sweeps the same equations which are hereinabove applied to the received signals $R_\kappa$. Thus in the general case the individual sweep signals may be obtained from the transmitted signals $T_\kappa$ as recorded by the recording equipment 16 in accordance with the following equations:

$$2NS_1 = \sum_{\kappa=1}^{2N} T_\kappa$$

$$2NS_2 = \sum_{\kappa=1}^{2N} (-)^{\kappa+1} T_\kappa$$

Accordingly from the foregoing it will be apparent that the present invention provides a novel method of seismic vibratory prospecting wherein the seismic energy transmitted consists of the sum or the difference of at least two sweep signals. An even number $2N$ of vibratory transmissions is used to allow the separation and obtention of the sum of the two individual sweep signals. The method of the present invention can therefore be practiced in a minimum of time, with a minimum of equipment and more economically than methods heretofore employed.

What I claim is:

1. A method of seismic exploration comprising the steps of:
   selecting a first desired electric signal,
   selecting a second desired electric signal,
   forming an even number of composite electric signals by algebraically summing said first and second electric signals,
   converting each composite electric signal to a composite acoustic signal,
   transmitting each composite acoustic signal into the earth,
   detecting each transmitted acoustic signal after it has travelled through a portion of the earth,
   converting each detected signal into a corresponding detected composite electric signal, and
   recording each detected composite electric signal.

2. The method of claim 1 and further including the step of:
   algebraically summing the recorded detected composite electric signals.

3. The method of claim 2 wherein,
   the sum of additions and/or subtractions of said recorded detected composite electric signals provides the sum of the detected electric signals resulting only from said first electric signals.

4. The method of claim 2 wherein,
   the sum of additions and/or subtractions of said recorded detected composite electric signals provides the sum of the detected electric signals resulting only from said second electric signal.

* * * * *

UNITED STATES PATENT OFFICE
CERTIFICATE OF CORRECTION

Patent No. 3,671,932　　　　　　　　Dated June 20, 1972

Inventor(s) Mark Holzman

It is certified that error appears in the above-identified patent and that said Letters Patent are hereby corrected as shown below:

Column 2, line 75, rewrite equation as follows:

$$T_k = S_1 + (-)^{K+1} S_2$$

Signed and sealed this 19th day of December 1972.

(SEAL)
Attest:

EDWARD M. FLETCHER, JR.　　　　　　　　ROBERT GOTTSCHALK
Attesting Officer　　　　　　　　　　　　Commissioner of Patents